United States Patent
Zhou et al.

(10) Patent No.: US 11,277,715 B2
(45) Date of Patent: Mar. 15, 2022

(54) TRANSMIT MULTICAST FRAME

(71) Applicant: Hewlett Packard Enterprise Development LP, Houston, TX (US)

(72) Inventors: Qiang Zhou, Beijing (CN); Guangzhi Ran, Beijing (CN); Jianpo Han, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 150 days.

(21) Appl. No.: 16/448,023

(22) Filed: Jun. 21, 2019

(65) Prior Publication Data
US 2020/0008017 A1 Jan. 2, 2020

(30) Foreign Application Priority Data

Jun. 29, 2018 (CN) .......................... 201810695089.6

(51) Int. Cl.
| | |
|---|---|
| *H04W 4/08* | (2009.01) |
| *H04W 24/08* | (2009.01) |
| *H04L 1/00* | (2006.01) |
| *H04W 72/04* | (2009.01) |

(52) U.S. Cl.
CPC ............. *H04W 4/08* (2013.01); *H04L 1/0003* (2013.01); *H04W 24/08* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 7,424,007 B2 | 9/2008 | Meier et al. | |
| 8,098,614 B1 | 1/2012 | Wang | |
| 9,036,538 B2* | 5/2015 | Palanki | H04B 1/7143 370/319 |
| 11,012,375 B2* | 5/2021 | Haag | H04L 12/185 |
| 2006/0050718 A1* | 3/2006 | Corson | H04W 52/26 370/400 |
| 2009/0175210 A1* | 7/2009 | Vijayan | H04L 1/0083 370/312 |
| 2009/0198827 A1* | 8/2009 | Hughes | H04L 65/4084 709/231 |
| 2010/0265864 A1 | 10/2010 | He et al. | |
| 2014/0192698 A1* | 7/2014 | Anchan | H04W 4/06 370/312 |
| 2016/0165574 A1 | 6/2016 | Chu et al. | |
| 2017/0149523 A1 | 5/2017 | Li et al. | |
| 2020/0053023 A1* | 2/2020 | Haag | H04L 49/254 |

OTHER PUBLICATIONS

Fuente et al, Joint Multicast/Unicast Scheduling with Dynamic Optimization for LTE Multicast Service, European Wireless 2014, Offenbach, Germany, 6 Pgs.

* cited by examiner

*Primary Examiner* — Christopher T Wyllie
(74) *Attorney, Agent, or Firm* — Hewlett Packard Enterprise Patent Department

(57) ABSTRACT

An example network device may include a processor to assign resource units (RUs) for a multicast frame and a unicast frame, wherein the assigned RUs include a first RU corresponding to the multicast frame and a second RU corresponding to the unicast frame, and wherein a client device corresponding to the unicast frame is excluded in a subset of client devices corresponding to the multicast frame; and transmit the multicast frame and the unicast frame in a same duration by the first RU and the second RU, respectively.

14 Claims, 13 Drawing Sheets

TRANSMIT MULTICAST FRAME

BACKGROUND

In a wireless system, devices may wirelessly communicate with each other. The wireless communication between the devices may support unicast, multicast and broadcast. In a specified duration, one device may initiate one of unicast, multicast and broadcast.

DETAILED DESCRIPTION

Figure 1:
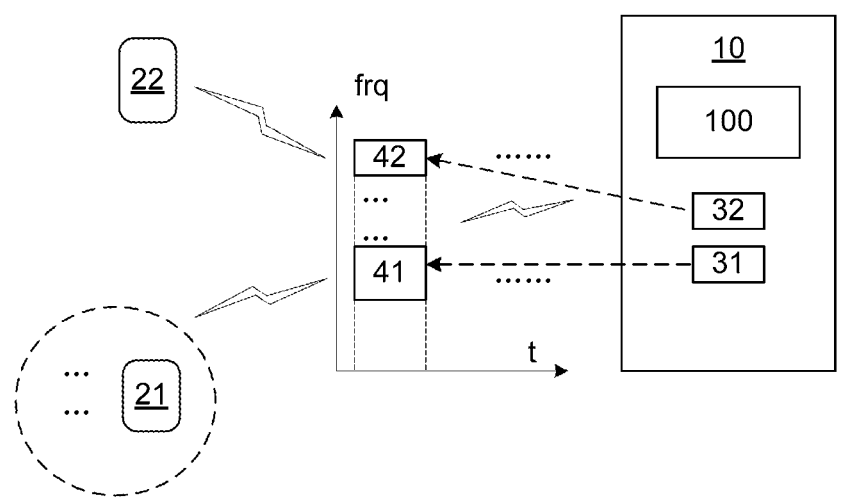
FIG. 1 is a block diagram illustrating an example wireless system according to present disclosure.

In a wireless system, such as the system utilizing orthogonal frequency division multiple access (OFDMA), a network device, e.g. an access point (AP) may wirelessly communicate with a plurality of other devices, e.g. client devices, by multicast. The plurality of other devices may be a subset of the devices within a radio frequency coverage area of the network device.

In some cases, e.g. in IEEE 802.11 standard, the multicast frame may be restricted at a low transmission rate. The low transmission rate of the multicast frame may cause long occupancy duration of air interface.

If the unicast frame allowed to support high transmission rate is pending during the transmission of the multicast, the transmission of the pending unicast frame may be delayed due to the long occupancy duration of air interface, so as to cause a high occupancy rate of air interface and low transmission efficiency. The high occupancy rate of air interface and the low transmission efficiency may further cause congestion of channel corresponding to the multicast frame and the pending unicast frame.

In order to improve the occupancy rate of air interface and the low transmission efficient, if the device, which is a receiver corresponding to the pending unicast frame, is excluded in the subset of the devices that are receivers of multicast frame, the multicast frame and the pending unicast frame may be considered to be simultaneously transmitted.

Due to the simultaneously transmitting, the pending unicast frame may be allowed to be transmitted without delay, in the duration of the air interface being occupied by transmitting the multicast frame. The none-overlapped receivers of simultaneously transmitted multicast frame and unicast frame may prevent confusion.

The multicast frame and the pending unicast frame may be sent in one physical layer convergence protocol (PLCP) protocol data unit (PPDU), and may be simultaneously transmitted over different resource units (RUs), respectively.

The RU assigned for the multicast frame may ensure a specified transmission rate of the multicast frame, e.g. by determining the parameters of the RU, such as bandwidth of the RU, modulation and coding scheme (MCS) index corresponding to the RU, and number of separate stream (NSS) corresponding to the RU, etc.

In some cases, e.g. in IEEE 802.11 standard, the specified transmission rate may be not lower than a basic rate. For example, the basic rate may be 1 Mbps corresponding to the frequency band of 2.4 GHz, or the basic rate may be 6 Mbps corresponding to the frequency band of 5 GHz.

In one example, a device comprising a processor to: assign resource units (RUs) for a multicast frame and a unicast frame, wherein the assigned RUs include a first RU corresponding to the multicast frame and a second RU corresponding to the unicast frame, and wherein a client device corresponding to the unicast frame is excluded in a subset of client devices corresponding to the multicast frame; and transmit the multicast frame and the unicast frame in a same duration by the first RU and the second RU, respectively.

In another example, a method comprising: assigning, by a processor of a network device, resource units (RUs) for a multicast frame and a unicast frame, wherein the assigned RUs include a first RU corresponding to the multicast frame and a second RU corresponding to the unicast frame, and wherein a client device corresponding to the unicast frame is excluded in a subset of client devices corresponding to the multicast frame; and transmitting, by the processor, the multicast frame and the unicast frame in a same duration by the first RU and the second RU, respectively.

In another example, a non-transitory computer readable storage medium stores instructions that, when executed by a processor of a network device, causes the processor to: assign resource units (RUs) for a multicast frame and a unicast frame, wherein the assigned RUs include a first RU corresponding to the multicast frame and a second RU corresponding to the unicast frame, and wherein a client device corresponding to the unicast frame is excluded in a subset of client devices corresponding to the multicast frame; and transmit the multicast frame and the unicast frame in a same duration by the first RU and the second RU, respectively.

As used herein, a "network device" generally includes a device that is adapted to transmit and/or receive signaling and to process information within such signaling and to provide wireless local area network services to a station (e.g., any data processing equipment such as a computer, cellular phone, personal digital assistant, tablet devices, etc.). The "network device" may include access points, data transfer devices, network switches, routers, controllers, etc.

As used herein, an "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

It is appreciated that examples described herein below may include various components and features. Some of the components and features may be removed and/or modified without departing from a scope of the device, method and non-transitory computer readable storage medium for. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

FIG. 1 is a block diagram illustrating an example wireless system according to present disclosure. Referring to FIG. 1, a wireless system, e.g. wireless local area networks (WLAN), includes a network device 10, such as an AP, a subset of client devices 21, and a client device 22 excluding in the subset of the client device 21.

One of the client devices 21 and the client device 22 may be a smartphone, a mobile phone, a Personal Digital Assistant (PDA), a portable personal computer, an AIO (all-in-one) computing device, a notebook, a convertible or hybrid notebook, a netbook, a tablet, a cellular device, a desktop computer, a multimedia player, an entertainment unit, a data communication device, a portable reading device, or any other computing device capable of transmitting and receiving wireless transmissions and consuming a wireless service. Wireless service may include, for example, WLAN access, guest authentication, printing, projector, locationing, indoor wayfinding, asset tracking, security/threat monitoring and/or detection, user behavior modeling, IoT (Internet of things) connectivity, wireless user data analytics, edge data analytics, edge security, edge data collection, etc.

The network device 10 may include a processor 100. The processor 100 may assign RUs for a multicast frame 31 and a unicast frame 32, wherein the assigned RUs include a first RU 41 corresponding to the multicast frame 31 and a second RU 42 corresponding to the unicast frame 32, and the client device 22 corresponding to the unicast frame 32 is excluded in the subset of the client devices 21 corresponding to the multicast frame 31.

The processor 100 may transmit the multicast frame 31 and the unicast frame 32 in a same duration by the first RU 41 and the second RU 42, respectively.

For example, the multicast frame 31 and the unicast frame 32 may be simultaneously transmitted over the first RU 41 and the second RU 42, respectively.

FIG. 2A to FIG. 2D are diagrams illustrating an example case of transmitting multicast frame in the example wireless system according to present disclosure. In the example case shown in FIG. 2A to FIG. 2D, the subset of the client devices 21 may be one of the multicast groups existing in the wireless system, and the client devices 21 may include a first member client device 21a with the device ID "STA 21a", a second member client device 21b with the device ID "STA 21b" and a third member client device 21c with the device ID "STA 21c".

Figure 2A:
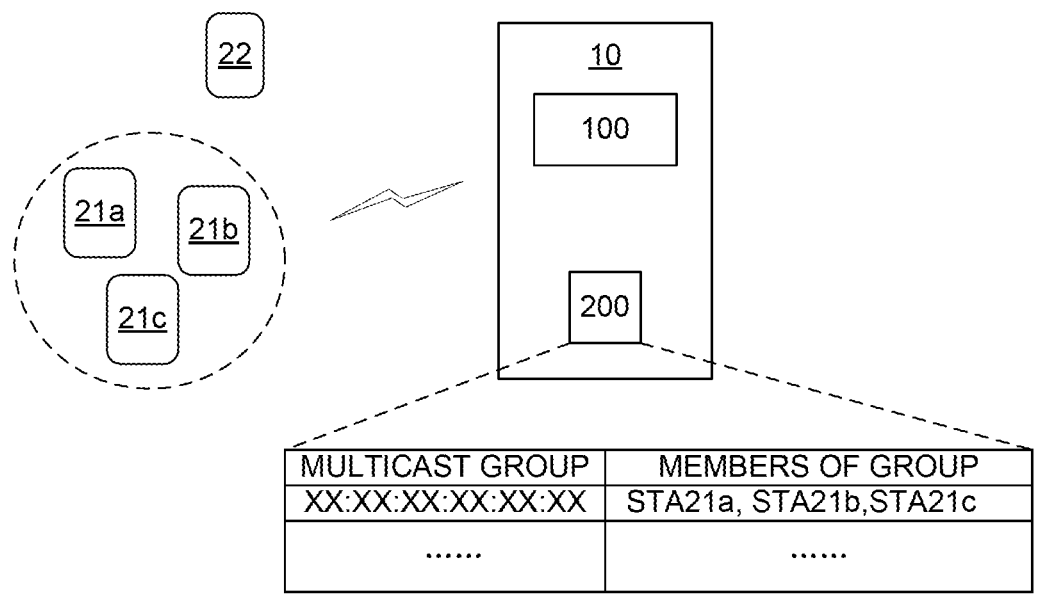
FIG. 2A to FIG. 2D are diagrams illustrating an example case of transmitting multicast frame in the example wireless system according to present disclosure.

Referring to FIG. 2A, the processor 100 may detect membership of multicast groups, the detected membership of multicast groups includes relationship of the three members in the subset, i.e. the first member client device 21a, the second member client device 21b and the third member client device 21c, belonging to a multicast group that may correspond to the identify "XX:XX:XX:XX:XX:XX". Based on the detected membership of multicast groups, the processor 100 may establish a table 200 listing the device IDs of the members in each multicast group.

Figure 2B:
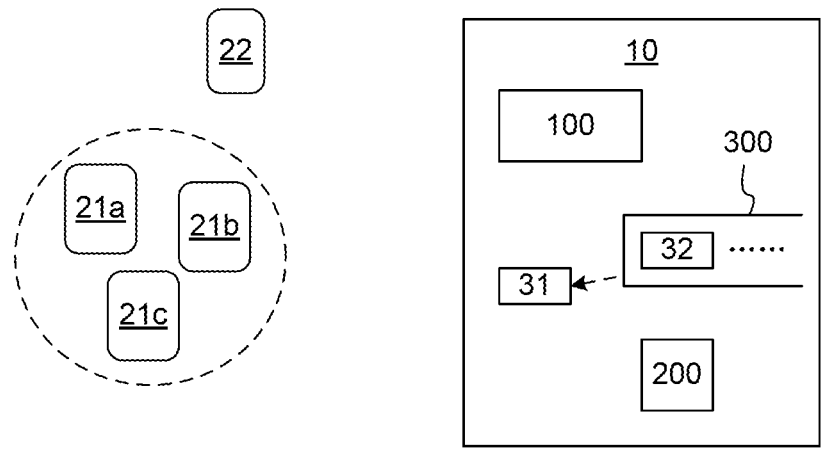

Referring to FIG. 2B, the processor 100 may determine that pending frames include both the multicast frame 31 and the unicast frame 32, and recognize whether the client device 22 corresponding to the unicast frame 32 is excluded in the subset of the client devices 21 corresponding to the multicast frame 31.

For example, the processor 100 may obtain the multicast frame 31 from a pending frame queue 300 in the network device, and determine whether the pending frame queue 300 includes the unicast frame 32 after obtaining the multicast frame 31. When determine that the unicast frame 32 is in the pending frame queue 300, the processor 100 may recognize the device ID of the receiver, i.e. the client device 22, corresponding to the unicast frame 32, and may compare the device ID of the client device 22 with the device IDs of the client devices 21 listed in the table 200, e.g. by looking up the table 200.

The processor 100 may further obtain the unicast frame 31 from the pending frame queue 300, in response to determining that the client device 22 corresponding to the unicast frame 32 is excluded in the subset of the client devices 21 corresponding to the multicast frame 31.

If the pending frame includes the multicast frame 31 and excludes the unicast frame 32, the processor 100 may assign RU for the multicast frame 31 without considering other frame.

Figure 2C:
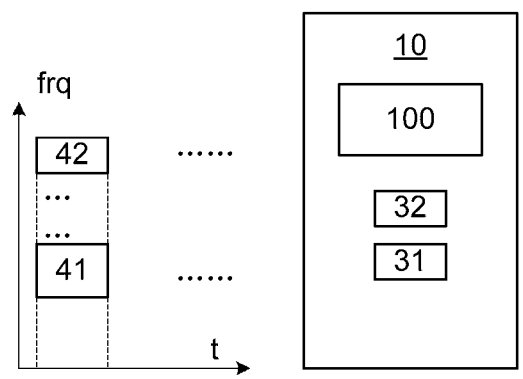

Referring to FIG. 2C, the processor 100 may assign the first RU 41 and the second RU 42 in response to determining that the pending frames include both the multicast frame 31 and the unicast frame 32, and may determine parameters of the first RU 41 to be assigned for the multicast frame 31, based on a specified transmission rate.

The parameters of the first RU 41 may be associated with the rate of the first RU 41, and may include at least one of bandwidth of the first RU 41, MCS index corresponding to the first RU 41, and NSS corresponding to the first RU 41.

For example, bandwidth of the first RU 41 may be 242 tones, MCS index corresponding to the first RU 41 may be high efficiency (HE) MCS index, NSS of the first RU 41 may be 1 stream.

The specified transmission rate may be the basic rate, e.g. 1 Mbps corresponding to the frequency band of 2.4 GHz, or the basic rate may be 6 Mbps corresponding to the frequency band of 5 GHz. The determined parameters of the first RU 41 may be compliant with a rate not less than the basic rate.

In some cases, the specified transmission rate of multicast may be assigned to be higher than the basic rate, e.g. 48 Mbps, 54 Mbps for high definition video scenario, by user. The determined parameters of the first RU 41 may be compliant with a rate not less than the assigned rate.

For example, the specified transmission rate may have a default value that is not less than the basic rate, and the processor 100 may update the specified transmission rate by a receive value corresponding to the assigned rate of the user.

In other example, the processor 100 may determine the client devices 21*a*, 21*b* and 21*c* corresponding to the multicast frame 31, e.g. by looking up the table 200, monitor the rate corresponding to the client devices 21*a*, 21*b* and 21*c*, and update the specified transmission rate based on the monitored rate.

Figure 2D:
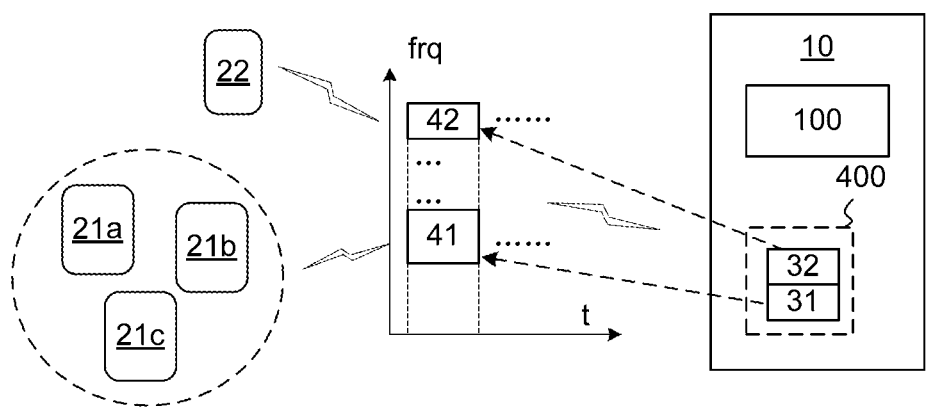

Referring to FIG. 2D, the processor 100 may send the multicast frame 31 and the unicast frame 32 in a same PPDU 400, and simultaneously transmit the multicast frame 31 and the unicast frame 32 included in the same PPDU 400 by the first RU 41 and the second RU 42, respectively.

Figure 3:
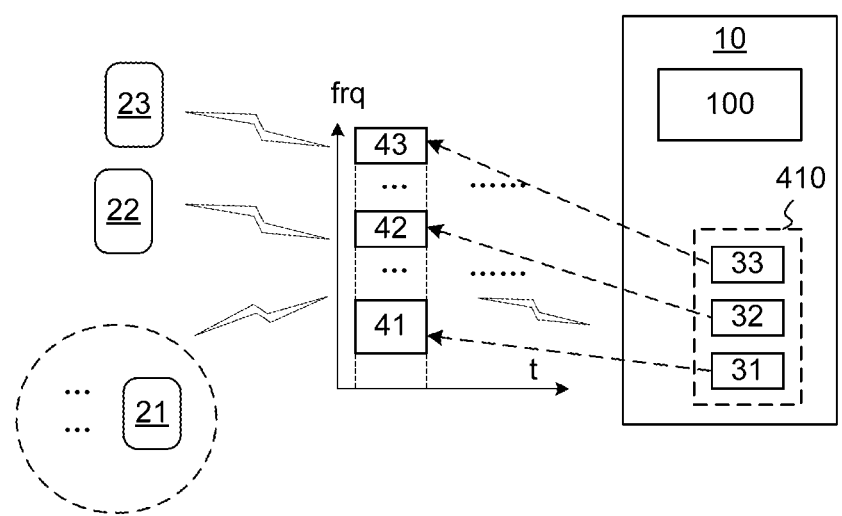
FIG. 3 is a diagram illustrating another example case of transmitting multicast frame in the example wireless system according to present disclosure.

FIG. 3 is a diagram illustrating another example case of transmitting multicast frame in the example wireless system according to present disclosure. Referring to FIG. 3, the wireless system including the network device 10, the subset of client devices 21 and the client device 22 may further include a client device 23 excluding in the subset of the client device 21.

The processor 100 of the network device 10 may assign RUs for the multicast frame 31 and unicast frames 32 and 33, wherein the assigned RUs include the first RU 41 corresponding to the multicast frame 31, the second RU 42 corresponding to the unicast frame 32, and the third RU 43 corresponding to the unicast frame 33. The client device 22 corresponding to the unicast frame 32 and the client device 23 corresponding to the unicast frame 33 are excluded in the subset of the client devices 21 corresponding to the multicast frame 31.

The processor 100 of the network device may also send the multicast frame 31 and unicast frames 32 and 33 in a same PPDU 410, and transmit the multicast frame 31 and the unicast frames 32 and 33 included in the PPDU 410 in a same duration by the first RU 41, the second RU 42 and the third RU 43, respectively.

That is, the unicast frames 32 and 33 corresponding, respectively, to different client devices 22 and 23 excluded in the subset of the client devices 21 may be simultaneously transmitted together with the multicast frame 31, by different RUs 41, 42 and 43.

Figure 4:
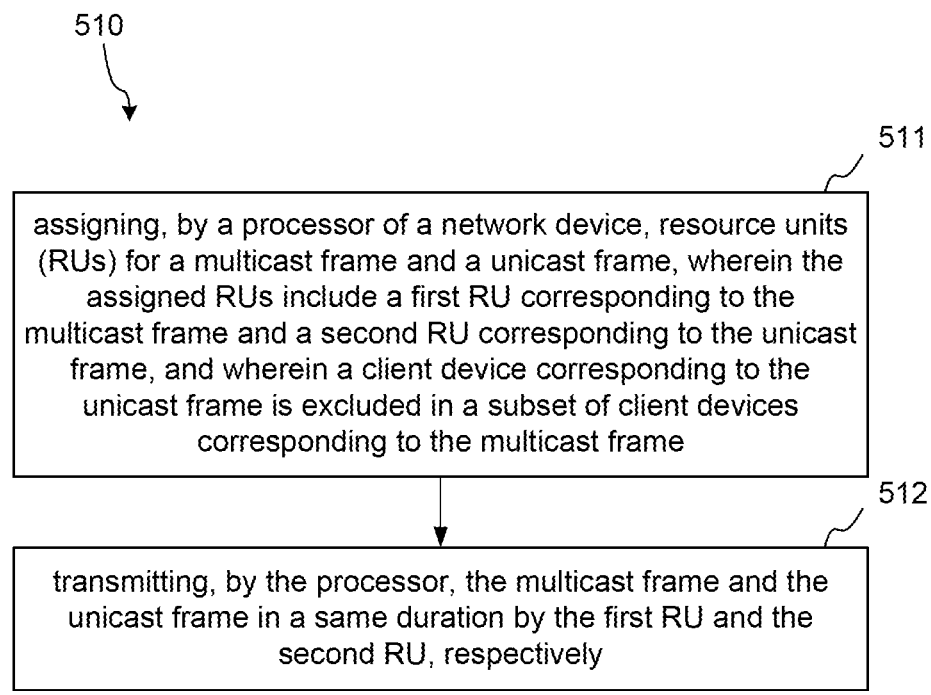
FIG. 4 is a flow chart illustrating an example method of transmitting multicast frame according to present disclosure.

FIG. 4 is a flow chart illustrating an example method of transmitting multicast frame according to present disclosure. Referring to FIG. 4:

The method 510 comprising: assigning, by a processor of a network device, resource units (RUs) for a multicast frame and a unicast frame, at 511, wherein the assigned RUs include a first RU corresponding to the multicast frame and a second RU corresponding to the unicast frame, and wherein a client device corresponding to the unicast frame is excluded in a subset of client devices corresponding to the multicast frame.

The method 510 also comprising: transmitting, by the processor, the multicast frame and the unicast frame in a same duration by the first RU and the second RU, respectively, at 512.

For example, the multicast frame and the unicast frame may be simultaneously transmitted over the first RU and the second RU, respectively.

Figure 5:
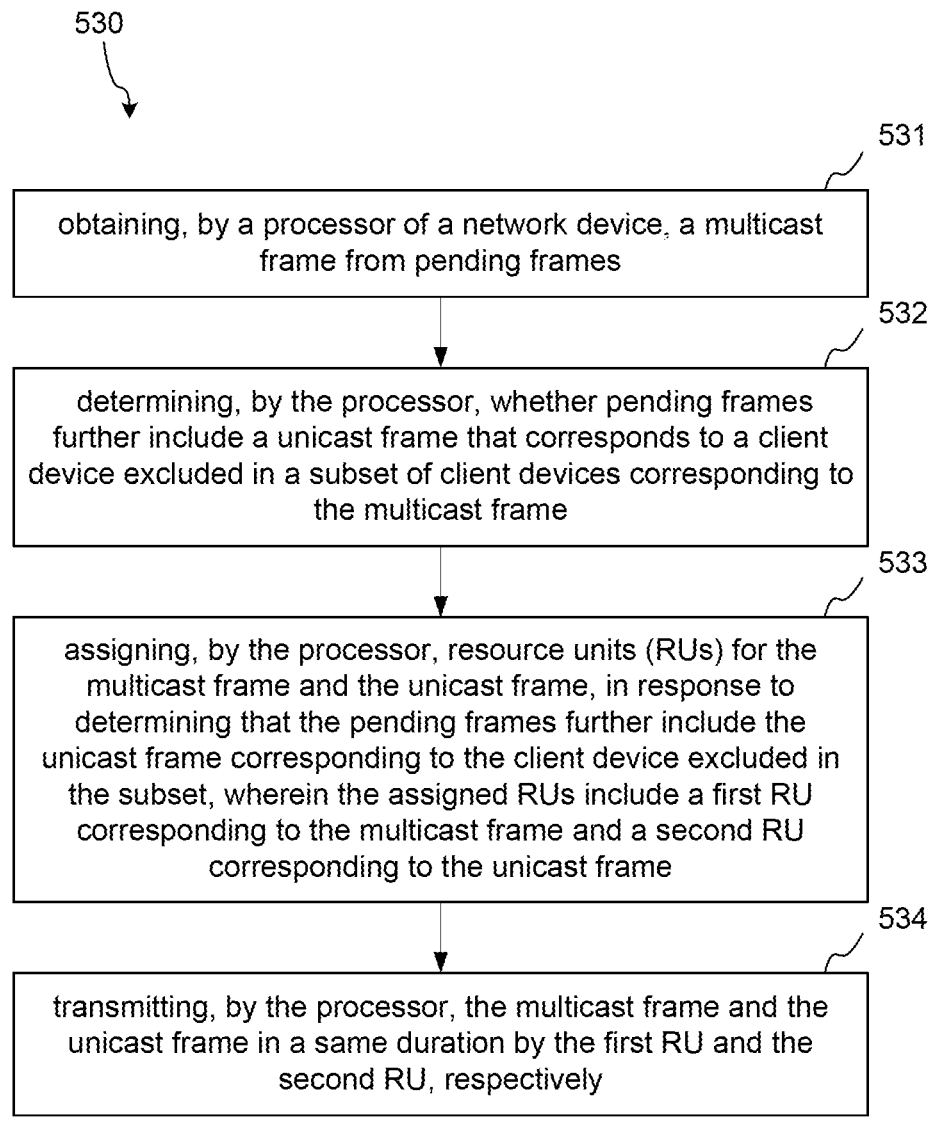
FIG. 5 is a flow chart illustrating another example method of transmitting multicast frame according to present disclosure.

FIG. 5 is a flow chart illustrating another example method of transmitting multicast frame according to present disclosure. Referring to FIG. 5:

The method 530 comprising: obtaining, by a processor of a network device, a multicast frame from pending frames, at 531.

For example, the multicast frame may be obtained from a pending frame queue in the network device.

The method 530 comprising: determining, by the processor, whether pending frames further include a unicast frame that corresponds to a client device excluded in a subset of client devices corresponding to the multicast frame, at 532.

For example, membership of multicast groups may be previously detected, and one of the multicast groups may include the subset of client device corresponding to the multicast frame. Based on the detected membership of multicast groups, it may be determined whether the client device corresponding to the unicast frame is excluded in the subset of client devices corresponding to the multicast frame.

If the client device corresponding to the unicast frame is excluded in the subset of the client devices corresponding to the multicast frame, the unicast frame may be also obtained from the pending frame queue.

The method 530 comprising: assigning, by the processor, resource units (RUs) for the multicast frame and the unicast frame, in response to determining that the pending frames further include the unicast frame corresponding to the client device excluded in the subset, at 533, wherein the assigned RUs include a first RU corresponding to the multicast frame and a second RU corresponding to the unicast frame.

The method 530 also comprising: transmitting, by the processor, the multicast frame and the unicast frame in a same duration by the first RU and the second RU, respectively, at 534.

If the pending frames excludes the unicast frame, or the client device corresponding to the unicast frame is included in a subset of client devices corresponding to the multicast frame, the method 530 may comprise: transmitting, by the processor, the multicast frame by a larger RU that at least has a bandwidth larger than the bandwidth of each of the first RU or the second RU, e.g. the larger RU may be allowed to include the total of available resources.

Figure 6:
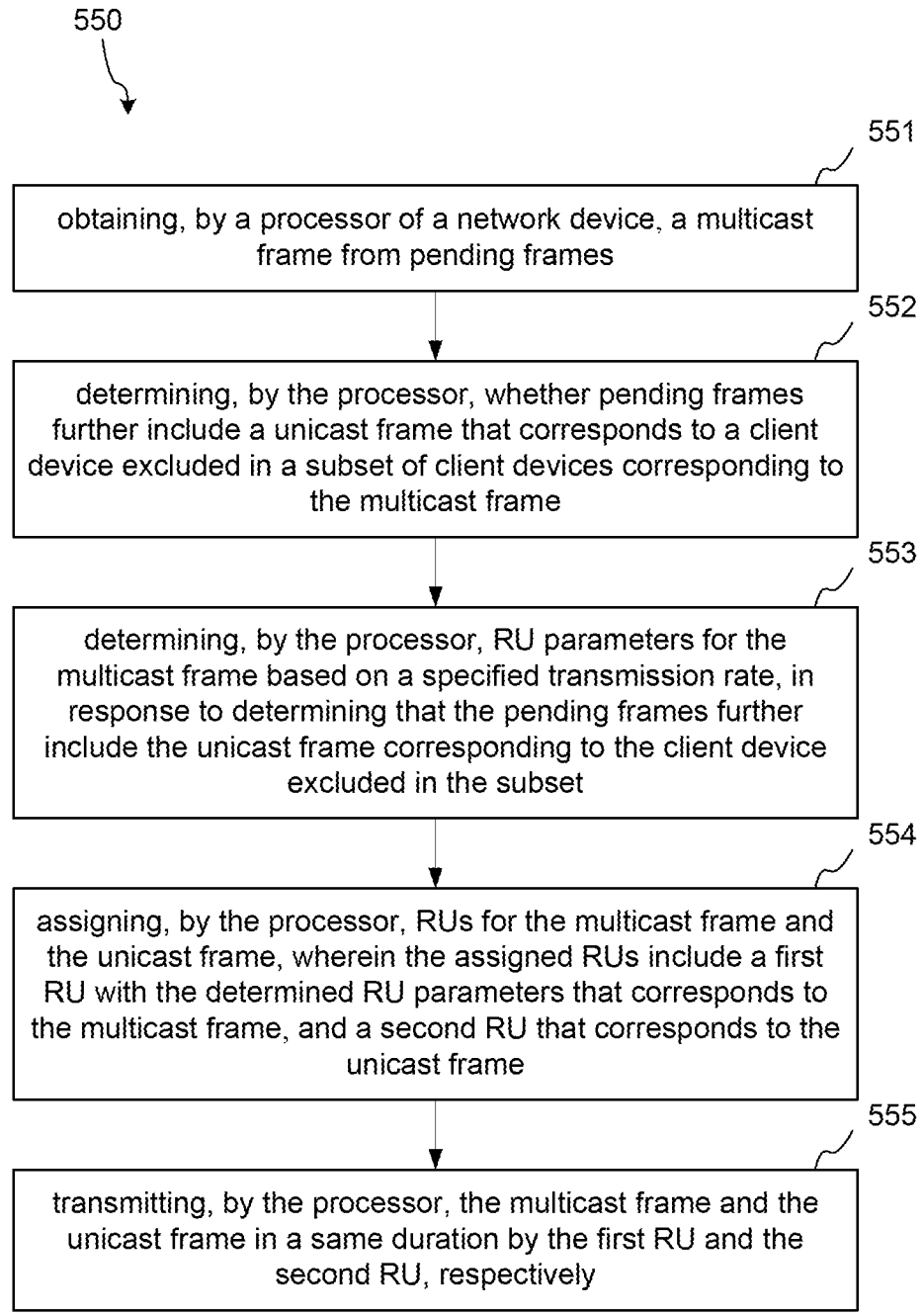
FIG. 6 is a flow chart illustrating another example method of transmitting multicast frame according to present disclosure.

FIG. 6 is a flow chart illustrating another example method of transmitting multicast frame according to present disclosure. Referring to FIG. 6:

The method 550 comprising: obtaining, by a processor of a network device, a multicast frame from pending frames, at 551.

The method 550 comprising: determining, by the processor, whether pending frames further include a unicast frame that corresponds to a client device excluded in a subset of client devices corresponding to the multicast frame, at 552.

The method 550 comprising: determining, by the processor, RU parameters for the multicast frame based on a specified transmission rate, in response to determining that the pending frames further include the unicast frame corresponding to the client device excluded in the subset, at 553.

For example, determining RU parameters may comprise: determining at least one of bandwidth of the RU to be assigned for the multicast frame, modulation and coding scheme (MCS) index corresponding to the RU to be assigned for the multicast frame, and number of separate stream (NSS) corresponding to the RU to be assigned for the multicast frame. The specified transmission rate may be not less than the basic rate, e.g. 1 Mbps corresponding to the frequency band of 2.4 GHz, or the basic rate may be 6 Mbps corresponding to the frequency band of 5 GHz.

The method 550 comprising: assigning, by the processor, RUs for the multicast frame and the unicast frame, at 554, wherein the assigned RUs include a first RU with the determined RU parameters that corresponds to the multicast frame, and a second RU that corresponds to the unicast frame.

The method 550 also comprising: transmitting, by the processor, the multicast frame and the unicast frame in a same duration by the first RU and the second RU, respectively, at 555.

Figure 7:
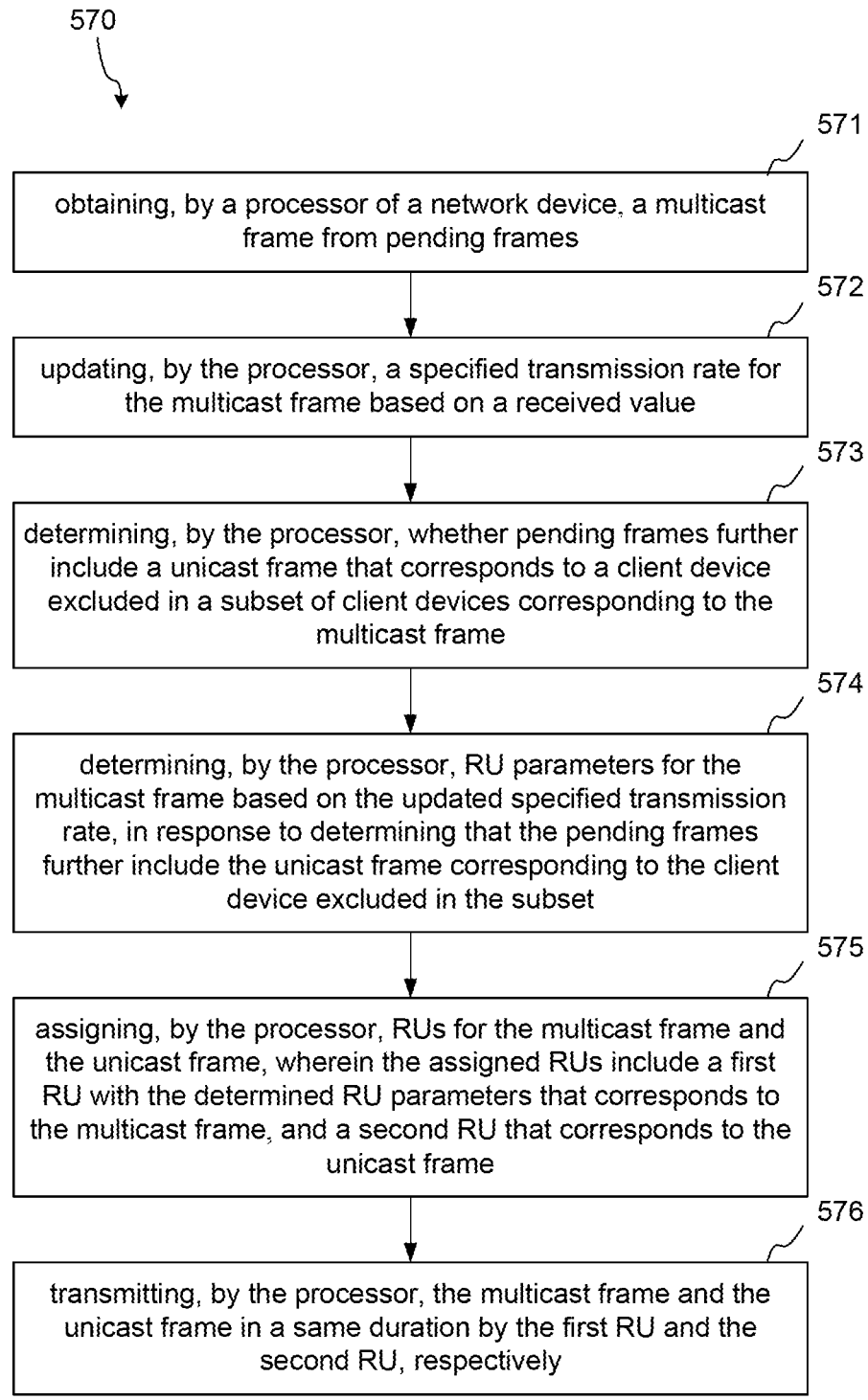
FIG. 7 is a flow chart illustrating another example method of transmitting multicast frame according to present disclosure.

FIG. 7 is a flow chart illustrating another example method of transmitting multicast frame according to present disclosure. Referring to FIG. 7:

The method 570 comprising: obtaining, by a processor of a network device, a multicast frame from pending frames, at 571.

The method 570 comprising: updating, by the processor, a specified transmission rate for the multicast frame based on a received value, at 572.

For example, the specified transmission rate may have a default value that is not less than the basic rate, e.g. 1 Mbps corresponding to the frequency band of 2.4 GHz, or the basic rate may be 6 Mbps corresponding to the frequency band of 5 GHz. The received value may correspond to a user's assigned rate that is higher than the basic rate, e.g. 48 Mbps, 54 Mbps for high definition video scenario.

The method 570 comprising: determining, by the processor, whether pending frames further include a unicast frame that corresponds to a client device excluded in a subset of client devices corresponding to the multicast frame, at 573.

The method 570 comprising: determining, by the processor, RU parameters for the multicast frame based on the updated specified transmission rate, in response to determining that the pending frames further include the unicast frame corresponding to the client device excluded in the subset, at 574.

The method 570 comprising: assigning, by the processor, resource units (RUs) for the multicast frame and the unicast frame, at 575, wherein the assigned RUs include a first RU with the determined RU parameters that corresponds to the multicast frame, and a second RU that corresponds to the unicast frame.

The method 570 also comprising: transmitting, by the processor, the multicast frame and the unicast frame in a same duration by the first RU and the second RU, respectively, at 576.

Figure 8:
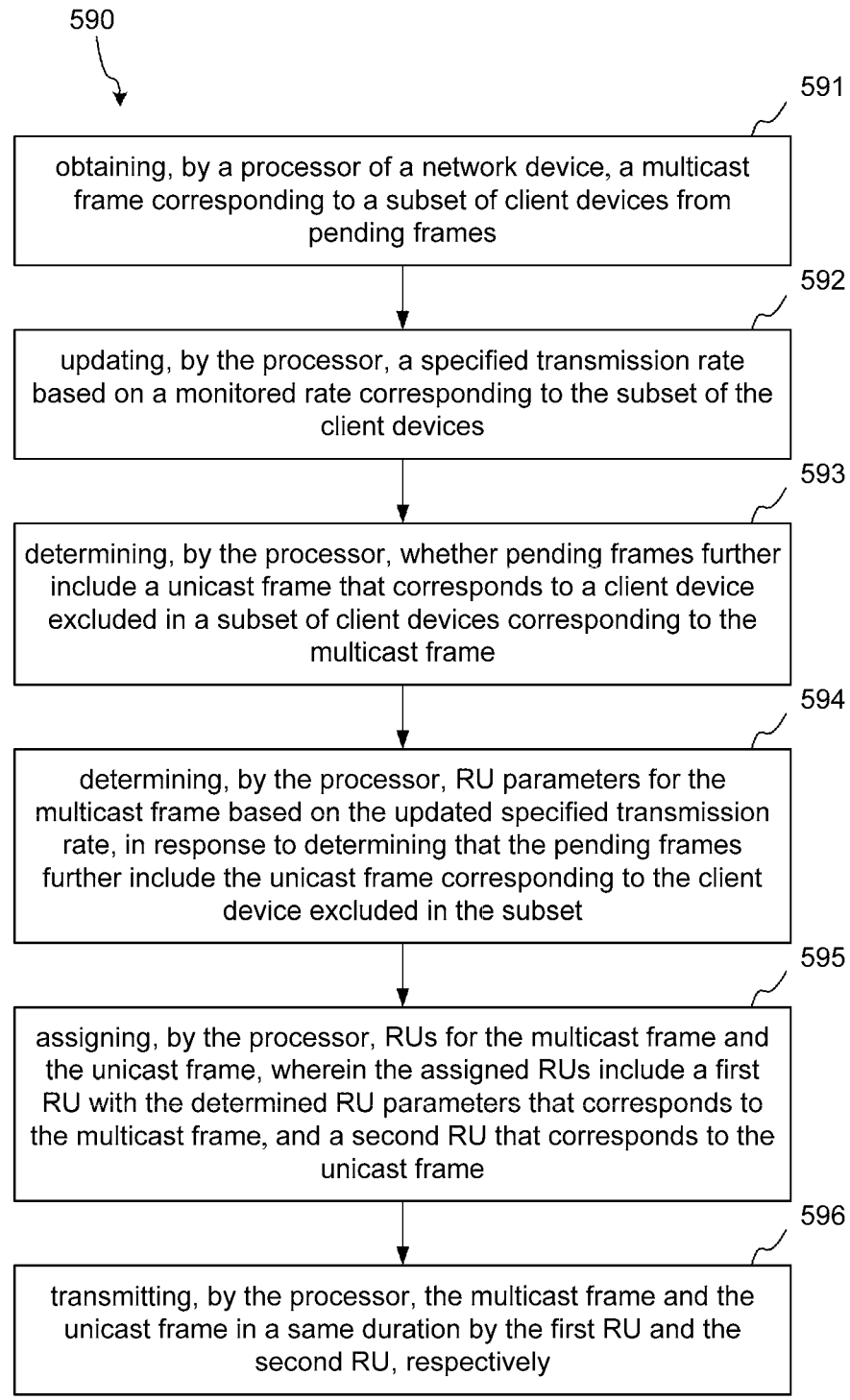
FIG. 8 is a flow chart illustrating another example method of transmitting multicast frame according to present disclosure.

FIG. 8 is a flow chart illustrating another example method of transmitting multicast frame according to present disclosure.

The method 590 comprising: obtaining, by a processor of a network device, a multicast frame corresponding to a subset of client devices from pending frames, at 591.

The method 590 comprising: updating, by the processor, a specified transmission rate based on a monitored rate corresponding to the subset of the client devices, at 592.

For example, membership of multicast groups may be previously detected, and one of the multicast groups may include the subset of client device corresponding to the multicast frame. Based on the detected membership of multicast groups, the rate of the subset of client devices may be monitored.

The method 590 comprising: determining, by the processor, whether pending frames further include a unicast frame that corresponds to a client device excluded in a subset of client devices corresponding to the multicast frame, at 593.

The method 590 comprising: determining, by the processor, RU parameters for the multicast frame based on the updated specified transmission rate, in response to determining that the pending frames further include the unicast frame corresponding to the client device excluded in the subset, at 594.

The method 590 comprising: assigning, by the processor, resource units (RUs) for the multicast frame and the unicast frame, at 595, wherein the assigned RUs include a first RU with the determined RU parameters that corresponds to the multicast frame, and a second RU that corresponds to the unicast frame.

The method 590 also comprising: transmitting, by the processor, the multicast frame and the unicast frame in a same duration by the first RU and the second RU, respectively, at 596.

Figure 9:
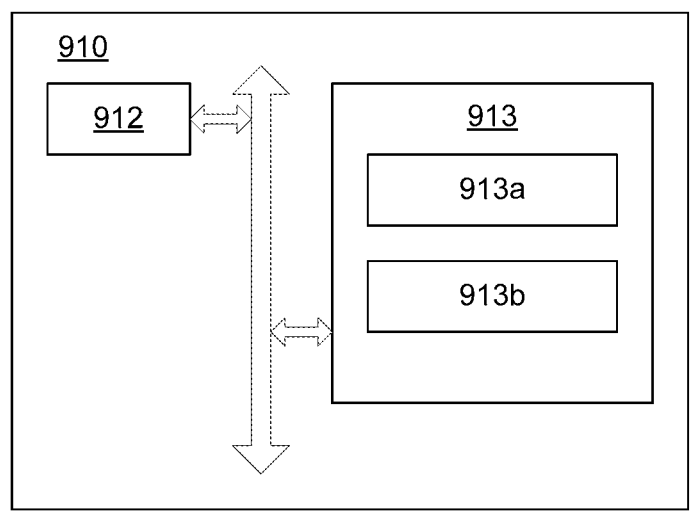
FIG. 9 is a block diagram illustrating an example network device according to present disclosure.

FIG. 9 is a block diagram illustrating an example network device according to present disclosure. Referring to FIG. 9, the network device 910 includes a processor 912 and a non-transitory computer readable storage medium 913.

The non-transitory computer readable storage medium 913 may store instructions executable for the processor 912.

The instructions include resource assigning instructions 913*a* that, when executed by the processor 912, may cause the processor 912 to assign resource units (RUs) for a multicast frame and a unicast frame, wherein the assigned RUs include a first RU corresponding to the multicast frame and a second RU corresponding to the unicast frame, and wherein a client device corresponding to the unicast frame is excluded in a subset of client devices corresponding to the multicast frame.

The instructions include frame transmitting instructions 913*b* that, when executed by the processor 912, may cause the processor 912 to transmit the multicast frame and the unicast frame in a same duration by the first RU and the second RU, respectively.

Figure 10:
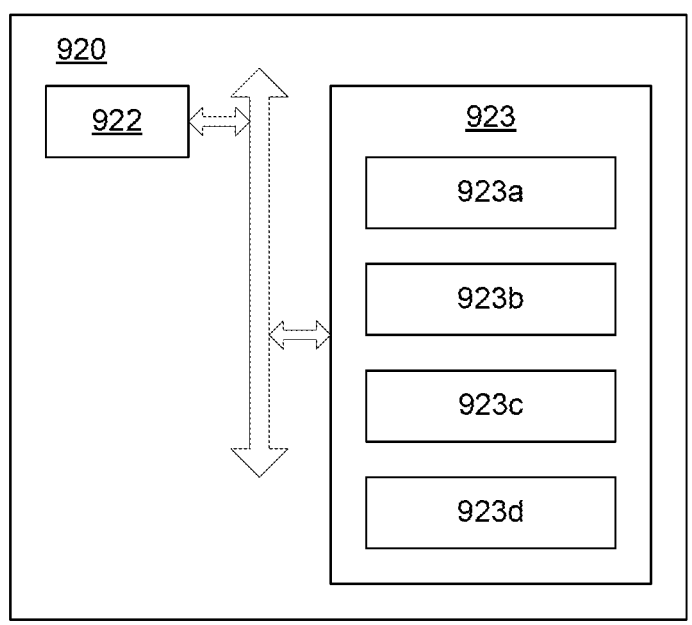
FIG. 10 is a block diagram illustrating another example network device according to present disclosure.

FIG. 10 is a block diagram illustrating another example network device according to present disclosure. Referring to FIG. 10, the network device 920 includes a processor 922 and a non-transitory computer readable storage medium 923.

The non-transitory computer readable storage medium 923 may store instructions executable for the processor 922.

The instructions include frame obtaining instructions 923*a* that, when executed by the processor 922, may cause the processor 922 to obtain a multicast frame from pending frames.

The instructions include frame checking instructions 923*b* that, when executed by the processor 922, may cause the processor 922 to determine whether the pending frames further include a unicast frame that corresponds to a client device excluded in a subset of client devices corresponding to the multicast frame.

The instructions include resource assigning instructions 923*c* that, when executed by the processor 922, may cause the processor 922 to assign resource units (RUs) for the multicast frame and the unicast frame, wherein the assigned RUs include a first RU corresponding to the multicast frame and a second RU corresponding to the unicast frame.

The instructions include frame transmitting instructions 923*d* that, when executed by the processor 922, may cause the processor 922 to transmit the multicast frame and the unicast frame in a same duration by the first RU and the second RU, respectively.

Figure 11:
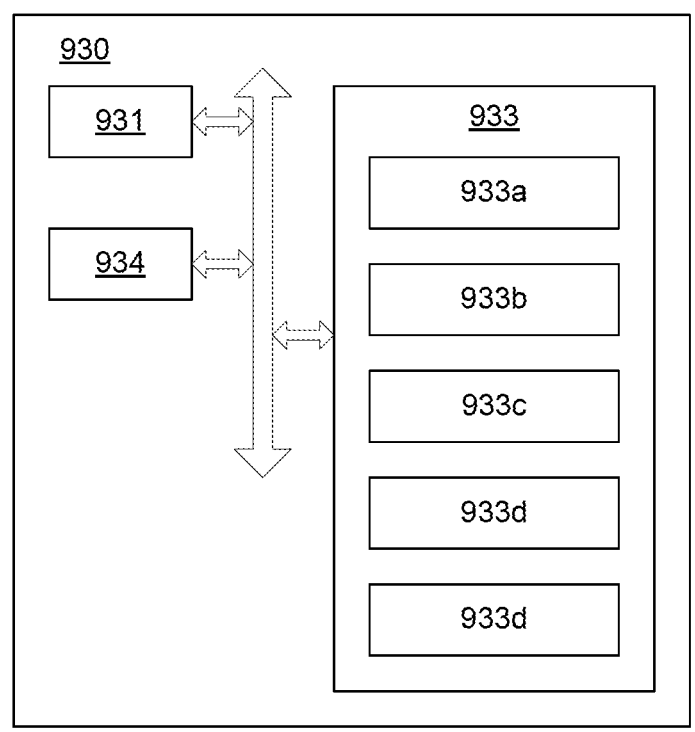
FIG. 11 is a block diagram illustrating another example network device according to present disclosure.

FIG. 11 is a block diagram illustrating another example network device according to present disclosure. Referring to FIG. 11, the network device 930 includes a processor 932, a non-transitory computer readable storage medium 933, a memory 934.

The non-transitory computer readable storage medium 933 may store instructions executable for the processor 932, and the memory 934 may store a specified transmission rate, the default value of the specified transmission rate may be a basic rate, e.g. 1 Mbps corresponding to the frequency band of 2.4 GHz, or the basic rate may be 6 Mbps corresponding to the frequency band of 5 GHz.

The instructions include frame obtaining instructions 933a that, when executed by the processor 932, may cause the processor 932 to obtain a multicast frame from pending frames.

The instructions include frame checking instructions 933b that, when executed by the processor 932, may cause the processor 932 to determine whether the pending frames further include a unicast frame that corresponds to a client device excluded in a subset of client devices corresponding to the multicast frame.

The instructions include parameter determining instructions 933c that, when executed by the processor 932, may cause the processor 932 to determine RU parameters for the multicast frame based on the specified transmission rate stored in the memory 934.

For example, determining RU parameters may comprise: determining at least one of bandwidth of the RU to be assigned for the multicast frame, modulation and coding scheme (MCS) index corresponding to the RU to be assigned for the multicast frame, and number of separate stream (NSS) corresponding to the RU to be assigned for the multicast frame.

The instructions include resource assigning instructions 933d that, when executed by the processor 932, may cause the processor 932 to assign resource units (RUs) for the multicast frame and the unicast frame, wherein the assigned RUs include a first RU with the determined parameters that corresponds to the multicast frame, and a second RU that corresponds to the unicast frame.

The instructions include frame transmitting instructions 933e that, when executed by the processor 932, may cause the processor 932 to transmit the multicast frame and the unicast frame in a same duration by the first RU and the second RU, respectively.

Figure 12:
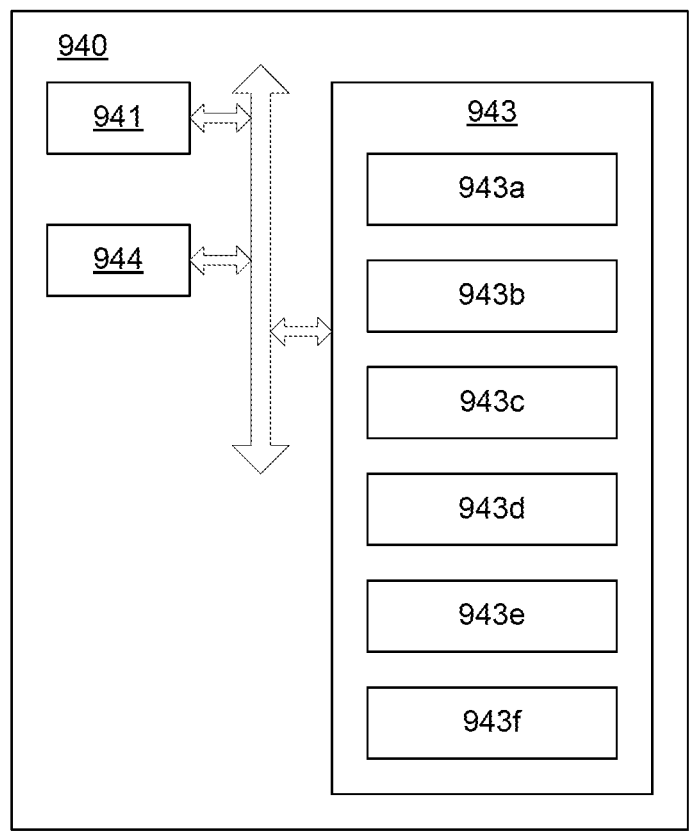
FIG. 12 is a block diagram illustrating another example network device according to present disclosure.

FIG. 12 is a block diagram illustrating another example network device according to present disclosure. Referring to FIG. 12, the network device 940 includes a processor 942, a non-transitory computer readable storage medium 943, a memory 944.

The non-transitory computer readable storage medium 943 may store instructions executable for the processor 942, and the memory 944 may store a specified transmission rate, the default value of the specified transmission rate may be a basic rate, e.g. 1 Mbps corresponding to the frequency band of 2.4 GHz, or the basic rate may be 6 Mbps corresponding to the frequency band of 5 GHz.

The instructions include frame obtaining instructions 943a that, when executed by the processor 942, may cause the processor 942 to obtain a multicast frame that corresponds to a subset of client devices from pending frames.

The instructions include frame obtaining instructions 943b that, when executed by the processor 942, may cause the processor 942 to update the specified transmission rate in the memory 944, based on a receive value or a monitored rate corresponding to the subset of the client devices.

The instructions include frame checking instructions 943c that, when executed by the processor 942, may cause the processor 942 to determine whether the pending frames further include a unicast frame that corresponds to a client device excluded in a subset of client devices corresponding to the multicast frame.

The instructions include parameter determining instructions 943d that, when executed by the processor 942, may cause the processor 942 to determine RU parameters for the multicast frame based on the updated specified transmission rate stored in the memory 944.

The instructions include resource assigning instructions 943e that, when executed by the processor 942, may cause the processor 942 to assign resource units (RUs) for the multicast frame and the unicast frame, wherein the assigned RUs include a first RU with the determined parameters that corresponds to the multicast frame, and a second RU that corresponds to the unicast frame.

The instructions include frame transmitting instructions 943f that, when executed by the processor 942, may cause the processor 942 to transmit the multicast frame and the unicast frame in a same duration by the first RU and the second RU, respectively.

While the present disclosure has been described in connection with certain example embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A network device comprising a processor configured to:
schedule a transmission of one or more unicast frames subsequent to a transmission of a multicast frame, wherein a first transmission rate of the scheduled multicast frame is lower than respective one or more second transmission rates of the scheduled one or more unicast frames;
determine whether any of a subset of first client devices scheduled to receive the scheduled transmission of the multicast frame matches respective one or more second client devices scheduled to receive the scheduled one or more unicast frames;
determine that none of the subset of the first client devices matches the one or more second client devices;
based on an expected delay resulting from transmitting any of the scheduled one or more unicast frames and the multicast frame over a common resource unit (RU):
assign separate RUs for the multicast frame and each of the scheduled one or more unicast frames, wherein the assigned RUs include a first RU corresponding to the scheduled multicast frame and one or more respective second RUs corresponding to the scheduled one or more unicast frames, wherein:
the assignment of the first RU comprises:
monitoring a rate of data reception of the subset of client devices scheduled to receive the scheduled multicast frame; and
selecting the first RU that supports a threshold transmission rate based on the monitored rate of date reception; and
transmit the scheduled multicast frame and the one or more scheduled unicast frames in a same duration by the first RU and the one or more second RUs, respectively.

2. The network device of claim 1, wherein the processor is further configured to:
obtain the multicast frame from pending frames, and
determine whether the pending frames further include the one or more unicast frames.

3. The network device of claim 1, wherein the processor is further configured to:
determine parameters of the first RU, based on a specified transmission rate.

4. The network device of claim 3, wherein the processor is further configured to:
update the specified transmission rate based on a received value.

5. The network device of claim 3, wherein the processor is further configured to:
update the specified transmission rate based on the monitored rate of data reception corresponding to the subset of the client devices.

6. The network device of claim 2, wherein
the specified transmission rate is not lower than a basic rate.

7. The network device of claim 1, wherein the transmission of the scheduled multicast frame, the first scheduled unicast frame and the second scheduled unicast frame is over a same physical layer convergence protocol (PLCP) protocol data unit (PPDU).

8. The network device of claim 1, wherein the assignment is further based on a frequency band on which the first RU resides, a bandwidth of the first RU, a modulation and coding scheme (MCS) index corresponding to the first RU, and a number of separate stream (NSS) corresponding to the first RU.

9. A method comprising:
scheduling a transmission of one or more unicast frames subsequent to a transmission of a multicast frame, wherein a first transmission rate of the scheduled multicast frame is lower than respective one or more second transmission rates of the scheduled one or more unicast frames;
determining whether any of a subset of first client devices scheduled to receive the scheduled transmission of the multicast frame matches respective one or more second client devices scheduled to receive the scheduled one or more unicast frames;
determining that none of the subset of the first client devices matches the one or more second client devices;
based on an expected delay resulting from transmitting any of the scheduled one or more unicast frames and the multicast frame over a common resource unit (RU):
assigning, by the processor, separate RUs for the multicast frame, and each of the scheduled one or more unicast frames, wherein the assigned RUs include a first RU corresponding to the scheduled multicast frame, and a second RU corresponding to the scheduled one or more unicast frames, wherein:
the assignment of the first RU comprises:
monitoring a rate of data reception of the subset of client devices scheduled to receive the scheduled multicast frame; and
selecting the first RU that supports a threshold transmission rate based on the monitored rate of date reception; and transmitting, by the processor, the scheduled multicast frame and the one or more scheduled unicast frames in a same duration by the first RU and the one or more second RUs, respectively.

10. The method of claim 9, further comprising:
obtaining, by the processor, the multicast frame from pending frames, and
determine, by the processor, whether the pending frames further include the unicast frame.

11. The method of claim 10, further comprising:
determining, by the processor, parameters of the first RU, based on a specified transmission rate.

12. The method of claim 11, further comprising:
updating, by the processor, the specified transmission rate based on a received value.

13. The method of claim 11, further comprising:
updating, by the processor, the specified transmission rate based on the monitored rate of data reception corresponding to the subset of the client devices.

14. A non-transitory computer readable storage medium storing instructions that, when executed by a processor of a network device, causes the processor to:
schedule a transmission of one or more unicast frames subsequent to a transmission of a multicast frame, wherein a first transmission rate of the scheduled multicast frame is lower than respective one or more second transmission rates of the scheduled one or more unicast frames;
determine whether any of a subset of first client devices scheduled to receive the scheduled transmission of the multicast frame matches respective one or more second client devices scheduled to receive the scheduled one or more unicast frames;
determine that none of the subset of the first client devices matches the one or more second client devices;
based on an expected delay resulting from transmitting any of the scheduled one or more unicast frames and the multicast frame over a common resource unit (RU):
assign separate RUs for the multicast frame and each of the scheduled one or more unicast frames, wherein the assigned RUs include a first RU corresponding to the scheduled multicast frame and one or more respective second RUs corresponding to the scheduled one or more unicast frames, wherein:
the assignment of the first RU comprises:
monitoring a rate of data reception of the subset of client devices scheduled to receive the scheduled multicast frame; and
selecting the first RU that supports a threshold transmission rate based on the monitored rate of date reception; and
transmit the scheduled multicast frame and the one or more scheduled unicast frames in a same duration by the first RU and the one or more second-RUs, respectively.

* * * * *